United States Patent
Langford et al.

[11] Patent Number: 6,015,163
[45] Date of Patent: Jan. 18, 2000

[54] SYSTEM FOR MEASURING PARAMETERS RELATED TO AUTOMOBILE SEAT

[76] Inventors: Gordon B. Langford, 11193 S. Star Cir., Sandy, Utah 84092; Cesar A. Montano, 450 N. Canyon Rd., Pleasant Grove, Utah 84062; Doug Odom, 6906 S. 300 West, Midvale, Utah 84047; Thomas Danielson, 6906 S. 300 West, Midvale, Utah 84047; Richard Allen, 6906 S. 300 West, Midvale, Utah 84047; Greg Putnam, 6906 S. 300 West, Midvale, Utah 84047; David Beck, 6906 S. 300 West, Midvale, Utah 84047

[21] Appl. No.: 08/947,001

[22] Filed: Oct. 8, 1997

Related U.S. Application Data

[60] Provisional application No. 60/028,448, Oct. 9, 1996.

[51] Int. Cl.$^7$ ........................................... B60R 21/32
[52] U.S. Cl. .......................... 280/735; 280/731; 340/667
[58] Field of Search ...................... 280/735, 731, 280/728, 741; 180/273; 340/667, 666, 436, 457.1

[56] References Cited

U.S. PATENT DOCUMENTS

| | | |
|---|---|---|
| Re. 32,003 | 10/1985 | Shoberg . |
| 3,174,125 | 3/1965 | Curby . |
| 3,229,511 | 1/1966 | Rossire . |
| 3,332,280 | 7/1967 | Fish et al. . |
| 3,517,999 | 6/1970 | Weaver . |
| 3,541,491 | 11/1970 | Worster . |
| 3,749,866 | 7/1973 | Tiazkun et al. ................. 180/273 |
| 3,820,529 | 6/1974 | Gause et al. . |
| 3,878,711 | 4/1975 | Randolph, Jr. . |
| 3,888,117 | 6/1975 | Lewis . |
| 3,895,288 | 7/1975 | Lampen et al. . |
| 3,958,455 | 5/1976 | Russell . |
| 3,968,467 | 7/1976 | Lampen et al. . |
| 3,971,250 | 7/1976 | Taylor . |
| 4,023,054 | 5/1977 | Taylor . |
| 4,038,867 | 8/1977 | Andrews et al. . |
| 4,123,158 | 10/1978 | Reytblatt . |
| 4,152,304 | 5/1979 | Tadewald . |
| 4,191,470 | 3/1980 | Butter . |
| 4,235,141 | 11/1980 | Eventoff . |
| 4,252,391 | 2/1981 | Sado . |
| 4,258,100 | 3/1981 | Fujitani et al. . |
| 4,258,720 | 3/1981 | Flowers . |
| 4,268,815 | 5/1981 | Eventoff et al. . |
| 4,269,506 | 5/1981 | Johnson et al. . |
| 4,273,682 | 6/1981 | Kanamori . |
| 4,276,538 | 6/1981 | Eventoff et al. . |
| 4,301,337 | 11/1981 | Eventoff . |
| 4,306,480 | 12/1981 | Eventoff et al. . |
| 4,314,227 | 2/1982 | Eventoff . |
| 4,314,228 | 2/1982 | Eventoff . |
| 4,315,238 | 2/1982 | Eventoff . |
| 4,355,692 | 10/1982 | Ostrelich . |
| 4,414,537 | 11/1983 | Grimes . |
| 4,420,251 | 12/1983 | James et al. . |
| 4,429,580 | 2/1984 | Testa et al. . |
| 4,444,205 | 4/1984 | Jackson . |
| 4,451,714 | 5/1984 | Eventoff . |
| 4,461,085 | 7/1984 | Dewar et al. . |
| 4,489,302 | 12/1984 | Eventoff . |
| 4,503,705 | 3/1985 | Polchaninoff . |
| 4,542,291 | 9/1985 | Zimmerman . |
| 4,575,117 | 3/1986 | Uchida . |
| 4,605,593 | 8/1986 | Iida . |

(List continued on next page.)

*Primary Examiner*—Paul N. Dickson
*Assistant Examiner*—Lynda Jasmin
*Attorney, Agent, or Firm*—Trask, Britt & Rossa

[57] ABSTRACT

A vehicle has a seat configured to receive a person or object. An array of flexible potentiometers is positioned in the seat to sense the mass or weight and the footprint or profile of that which is in the seat. The flexible potentiometers supply a signal through circuitry to enable or disable an air bag system in the vehicle. The air bag system operates under selected conditions such as what may be experienced in a crash of the vehicle to deploy the air bag to preclude movement of a seat occupant into vehicle structure.

5 Claims, 6 Drawing Sheets

U.S. PATENT DOCUMENTS

| | | |
|---|---|---|
| 4,639,711 | 1/1987 | Edholm et al. . |
| 4,649,784 | 3/1987 | Fulks et al. . |
| 4,703,335 | 10/1987 | Matsushita et al. . |
| 4,715,235 | 12/1987 | Fukui et al. . |
| 4,729,809 | 3/1988 | Dery et al. . |
| 4,745,930 | 5/1988 | Confer . |
| 4,748,433 | 5/1988 | Jackson et al. . |
| 4,763,534 | 8/1988 | Hager . |
| 4,786,764 | 11/1988 | Padula et al. . |
| 4,810,992 | 3/1989 | Eventoff . |
| 5,074,583 | 12/1991 | Fujita et al. ............................ 280/735 |
| 5,086,652 | 2/1992 | Kropp . |
| 5,086,785 | 2/1992 | Gentile et al. . |
| 5,109,341 | 4/1992 | Blackburn et al. . |
| 5,134,248 | 7/1992 | Kiec et al. . |
| 5,157,372 | 10/1992 | Langford . |
| 5,172,790 | 12/1992 | Ishikawa et al. . |
| 5,202,281 | 4/1993 | Ishibashi . |
| 5,222,399 | 6/1993 | Kropp . |
| 5,232,243 | 8/1993 | Blackburn et al. ..................... 280/735 |
| 5,309,135 | 5/1994 | Langford . |
| 5,350,189 | 9/1994 | Tsuchitani et al. . |
| 5,413,378 | 5/1995 | Steffens, Jr. et al. ................... 280/735 |
| 5,423,569 | 6/1995 | Reighard et al. . |
| 5,454,591 | 10/1995 | Mazur et al. . |
| 5,458,366 | 10/1995 | Hock et al. . |
| 5,460,405 | 10/1995 | Faigle et al. . |
| 5,494,311 | 2/1996 | Blackburn et al. . |
| 5,515,725 | 5/1996 | Tabota et al. . |
| 5,570,903 | 11/1996 | Meister et al. ......................... 280/735 |
| 5,573,269 | 11/1996 | Gentry et al. .......................... 280/735 |
| 5,583,476 | 12/1996 | Langford . |
| 5,612,876 | 3/1997 | Zeidler et al. ......................... 180/273 |
| 5,739,757 | 4/1998 | Gioutsos ................................ 340/667 |
| 5,864,295 | 1/1999 | Jarocha .................................. 340/667 |

SYSTEM FOR MEASURING PARAMETERS RELATED TO AUTOMOBILE SEAT

This application claims the benefit of U.S. Provisional Application Ser. No. 60/028,448 filed Oct. 9, 1996.

BACKGROUND OF THE INVENTION

1. Field of the Invention

The invention relates to the use of deflection sensors, such as flexible potentiometers, to detect various phenomena or parameters related to a surface such as an automobile seat.

SUMMARY OF INVENTION

It is desirable to be able to detect whether a person is in an automobile seat so that if one is not in the automobile seat, an air bag will not be deployed in the case of a crash. Further, it is desirable to detect a profile of a person sitting in the seat or tell the difference between a person and a bag of groceries. For example, if the person is a child, circuitry may be configured such that the air bag is disabled or not enabled depending on the default condition. If a person has a weight above a threshold, the timing of the deployment of an air bag may be adjusted based on the weight of the person. Alternatively, or in addition, the magnitude or rate of inflation of the air bag may be controlled by considering the weight of the person. Still further, the timing and/or magnitude or rate of inflation may be controlled based on the position of a person. For example, if a person is leaning back, the timing of deployment would be different than if the person is leaning forward. Circuitry may be included to disable or not enable (depending on the default condition) deployment of the air bag if a child car seat is detected.

Deflection sensors, such as flexible potentiometers, may be used to detect whether a person is in the seat, the position of the person, and a profile of the person. A flexible potentiometer may also be used to detect the presence and orientation of a child safety seat or other object (including a person).

A flexible potentiometer requires some sort of deflectable or bendable substrate to which at least one section of variable resistive material is applied in some fashion. A flexible potentiometer may include more than one section of variable resistive material separated by a conductive material. The sections may form a grid and may be in series and/or in parallel. In this way, the sections may cover more area than a single sensor might. Components such as logic gates or buffers may separate the variable resistive materials. Further, separate flexible potentiometers (each have a different substrate) may be joined in series and/or in parallel to cover a greater surface area.

DESCRIPTION OF ILLUSTRATED EMBODIMENTS

Figure 1A:
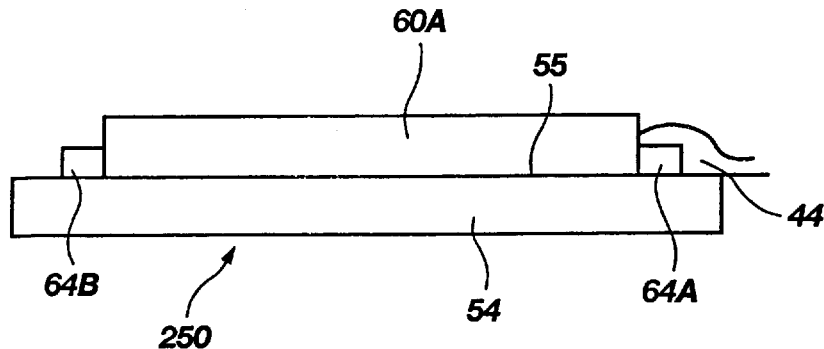
FIG. 1A is a side view of a flexible potentiometer.
Figure 1B:
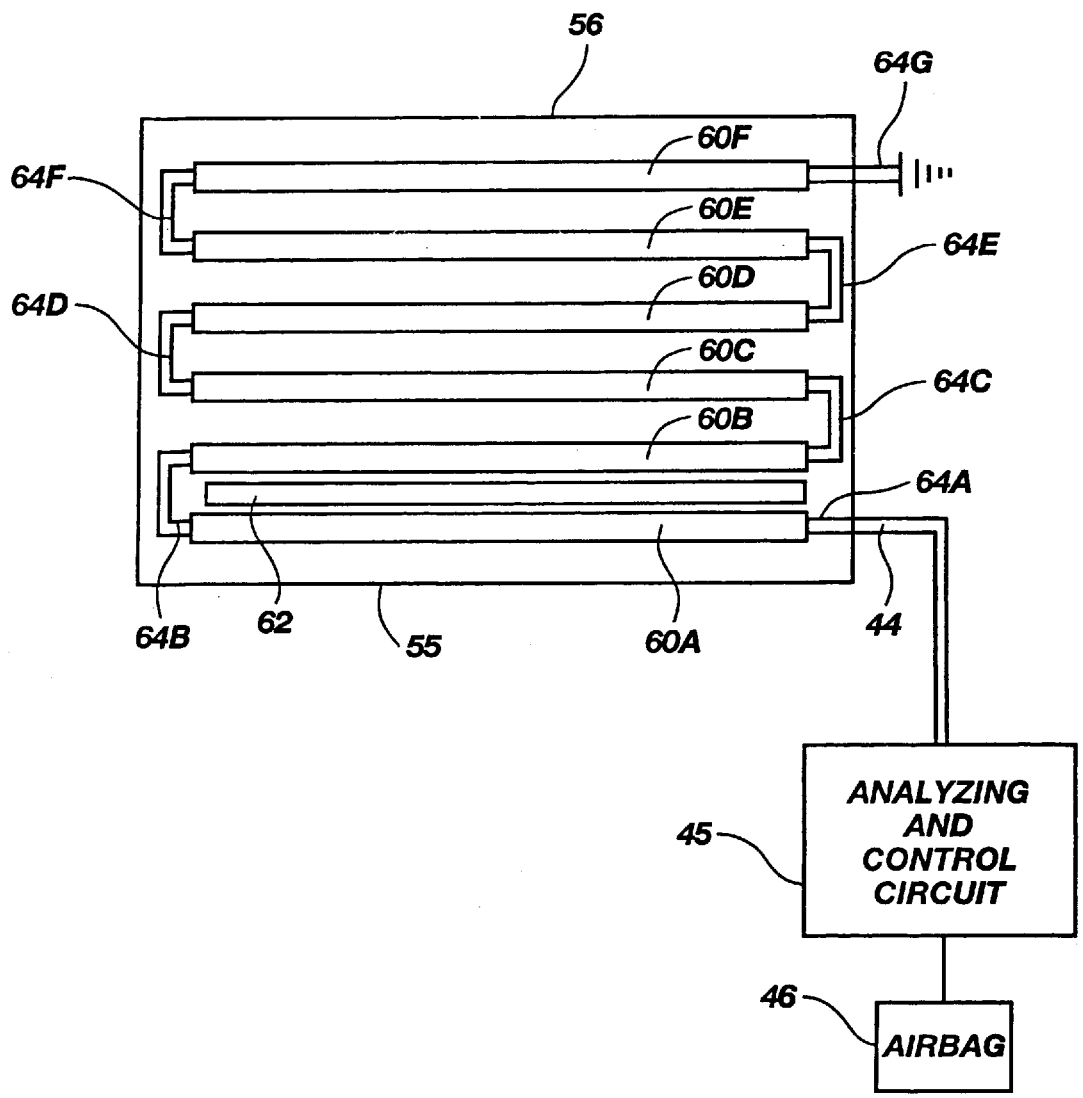
FIG. 1B is a top view of a flexible potentiometer with sections of resistive material connected to analyzing circuitry.

Referring to FIGS. 1A and 1B, a flexible potentiometer 250 includes a substrate 54 on which variable resistive material sections 60A, 60B, 60C, 60D, 60E and 60F are applied. Variable resistive material sections 260 are joined to each other by conductive materials 64B, 64C, 64D, 64E and 64F. Variable resistive material sections 60A, 60B, 60C, 60D, 60E, and 60F are joined to conductor 44 and to ground through conductive materials 64A and 64G. (An individual flexible potentiometer includes variable resistive material on a substrate.) Openings may be cut or formed in substrate 54 between variable resistive materials 60A and 60B, between 60B and 60C, between 60C and 60D, and any and all other adjoining pairs of conductive materials and between the outboard conductive material such as conductive material 60A and the outside edge 55 and conductive material 60 F and its outside edge 56 to increase the flexibility of substrate 54. Opening 62 is an example. Other openings are not shown to avoid clutter.

Substrate 54 may be constructed of various materials including various polymers, such as polyamide, polycarbonate, polyimide (Kapton), and polyester (Mylar), which may be thermoplastics. Conductor 44 is connected to analyzing and control circuitry 45, which determines whether to deploy an air bag such as air bag 46.

Applying variable resistive materials in parallel on a substrate is only one of many configurations. For example, variable resistive materials may be applied in diagonal arrangements.

A group of flexible potentiometers connected in series (such as in FIG. 1B) placed in or under a seat cushion or seat surface can detect the presence of a person and, with proper calibration of the analyzing circuitry, can determine the weight of that person. Of course it can detect the weight of an object as well.

Figure 2B:
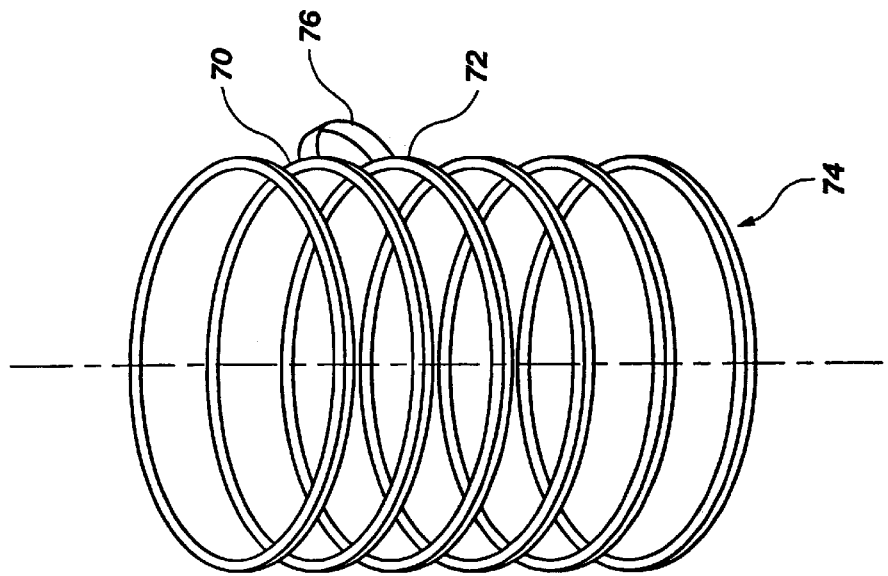
FIG. 2B depicts the coil seat spring of FIG. 2A compressed.
Figure 2A:
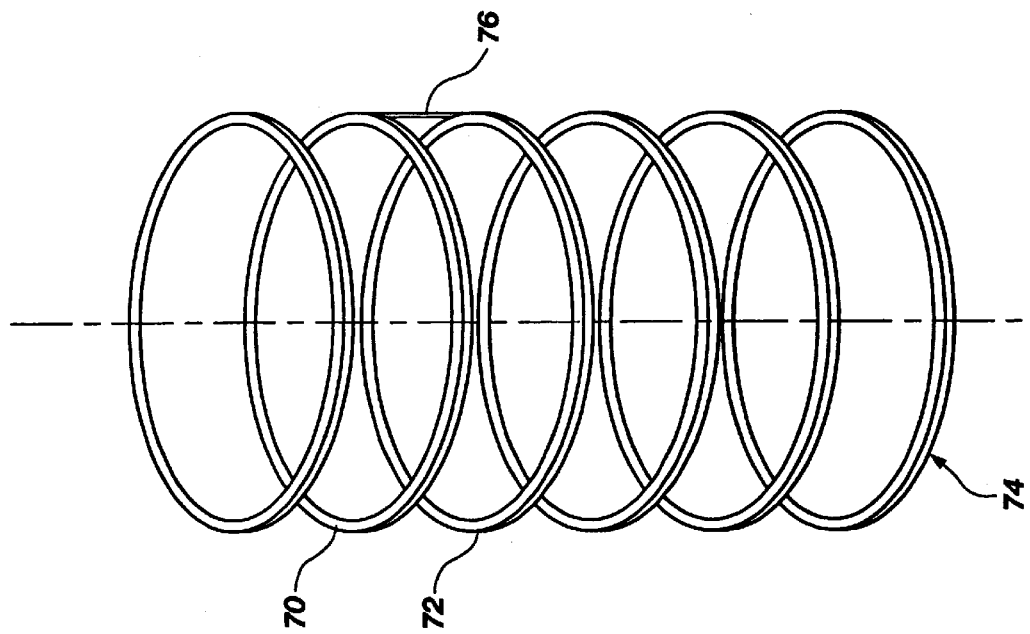
FIG. 2A depicts a coil seat spring with a flexible potentiometer.

Presence and weight may also be detected by placing a flexible potentiometer between two sections 70 and 72 of a spring 74 (see FIGS. 2A and 2B). As the sections 70 and 72 move closer or farther, the amount of resistance in the flexible potentiometer 76 changes to reflect the deflection and in turn the weight of the object (or person) on the surface and depending on the pattern of the conductors, the footprint or profile of the person or object. As the load or force is applied to the spring 74, the spring 74 of FIGS. 2A and 2B collapses upon itself. The flexible potentiometer 76 is positioned between two sections 70 and 72 and thereby bends to produce a rise in resistance. That is, any weight placed on the seat has a footprint or and profile that can be recognized based on the amount and positioning of the sensed deflections.

Figure 3B:
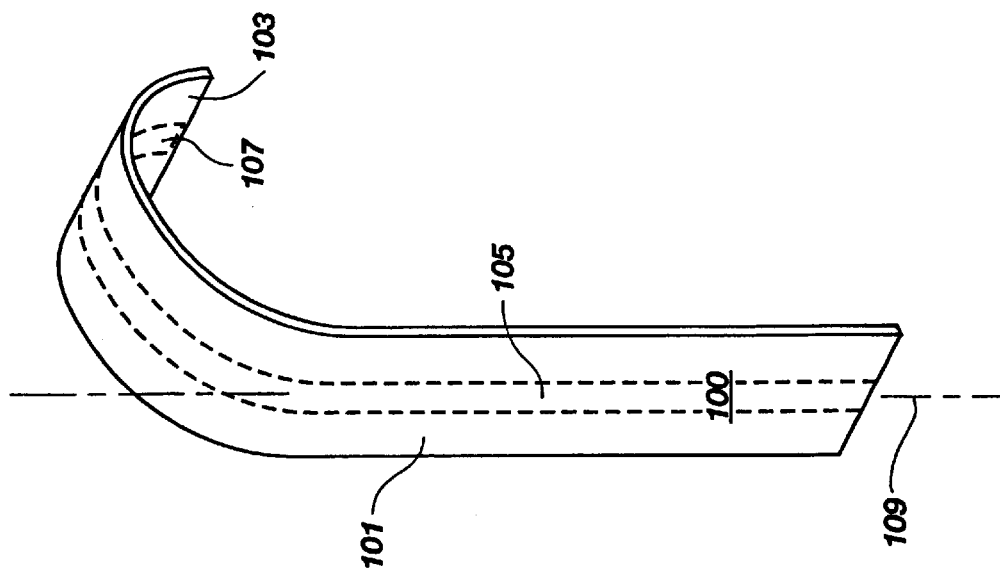
FIG. 3B depicts the leaf spring with a flexible potentiometer of FIG. 3A in a deflected condition.
Figure 3A:
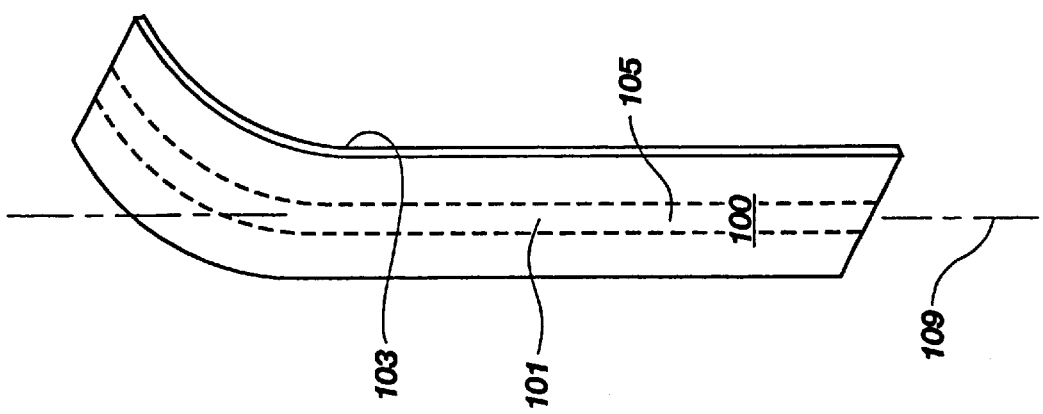
FIG. 3A depicts a leaf spring with a flexible potentiometer for use with a car seat.

FIGS. 3A and 3B show a leaf spring 100 which is being deflected between an unweighted (FIG. 3A) and a weighted (FIG. 3B) configuration. The flexible potentiometer is attached to either main surface 101 and 103 of the leaf spring 100. In some applications, the conductive material 105 and 107 may be laminated directly onto the main surfaces 101 and 103. The leaf spring 100 as so configured may be positioned with its axis 109 oriented vertically as shown, oriented horizontally or in any combination of angles. The leaf spring 100 of FIGS. 3A and 3B may work in the seat, the back of the seat and in the head rest associated with the seat. As the load or force is applied to the seat, the spring compresses downwardly causing the flexible potentiometer associated therewith to bend. The resistance of the potentiometer therefore changes and increases.

Figure 4B:
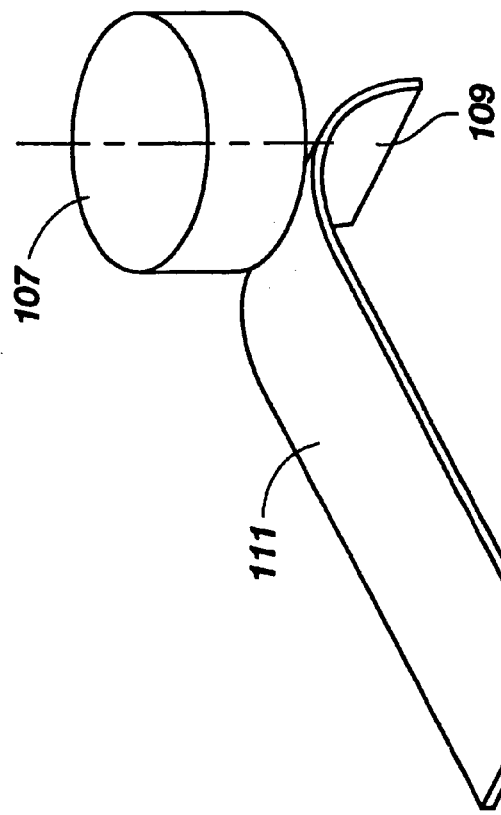
FIG. 4B depicts the flexible potentiometer of FIG. 4A with the load and in a deflected condition.
Figure 4A:
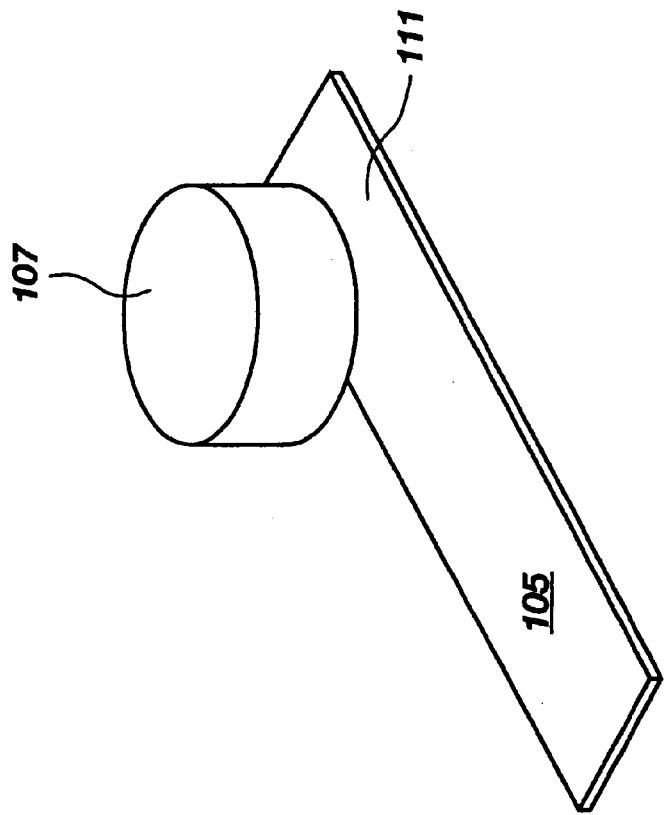
FIG. 4A depicts a flexible potentiometer with a load positioned proximate thereto.

FIGS. 4A and 4B show leaf spring 105 in a horizontal orientation with a load 107 positioned to cause deflection as seen in FIG. 4B. The flexible potentiometer 113 is attached to or laminated on the upper surface 111 attached to or laminated on the upper surface 111. Alternately, a flexible potentiometer 115 is laminated or attached to the lower surface 109. Either flexible potentiometer 111 or 115 senses the deflection of the leaf spring 105 from the axis 117. The spring 105 may be oriented either horizontally as depicted or vertically or with the axis 117 at some other desired orientation between the horizontal and the vertical. The illustrated configuration may be used in the seat itself as well as in the seat back and in the associated head rest. As the illustrated load 107 is applied, it causes the flexible bend sensor 113 or 115 to deflect to change its resistance.

Figure 5A:
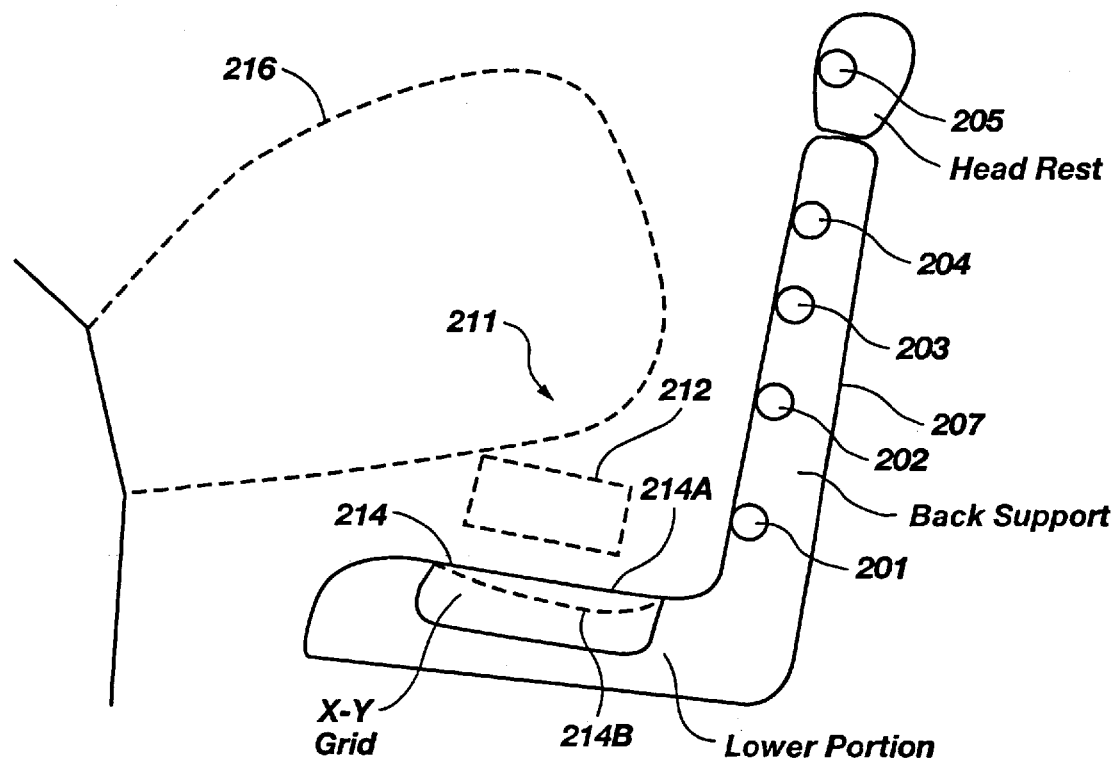
FIG. 5A is a side view of a car seat with a grid associated therewith.
Figure 5B:
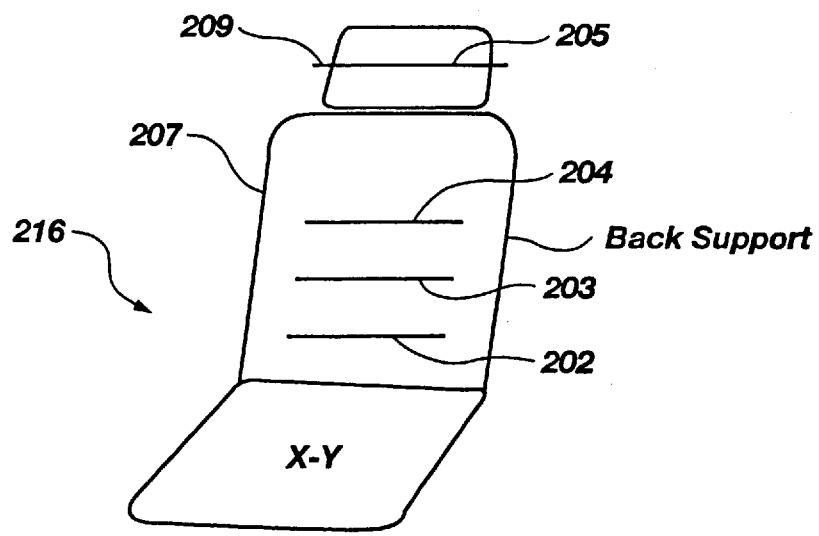
FIG. 5B is a front perspective view of the car seat of FIG. 5A.

The position of a person may be detected by placing flexible potentiometers (not in series in some embodiments, or in series but with different initial resistant values) at different locations in the seat. For example, flexible potentiometers 201, 202, 203, 204, and 205 (FIGS. 5A and 5B), could be placed up back support 207 and head rest 209 of a seat 211. When a person leans against one of the back support 207 and the head rest 209 the resistance changes allowing the analyzing circuitry to determine the position of the person. The person or object, such as object 212, when positioned on the seat 211, causes the seat and the grid 213 to deflect so the surface 214 moves from an at rest position 214A to a deflected position 214B. Given a desired or selected weight and footprint, circuits cause the air bag system to be enabled so that upon receipt of a deploy signal from, for example, a crash sensor, the air bag will be placed in a deployed position 216 proximate the person or object on the seat 211.

Flexible potentiometers, such as potentiometer 202, may also be positioned in lumbar location for inflation control.

Seat location and orientation (e.g., six axis seat) may be determined through triggering flexible potentiometers.

Figure 6:
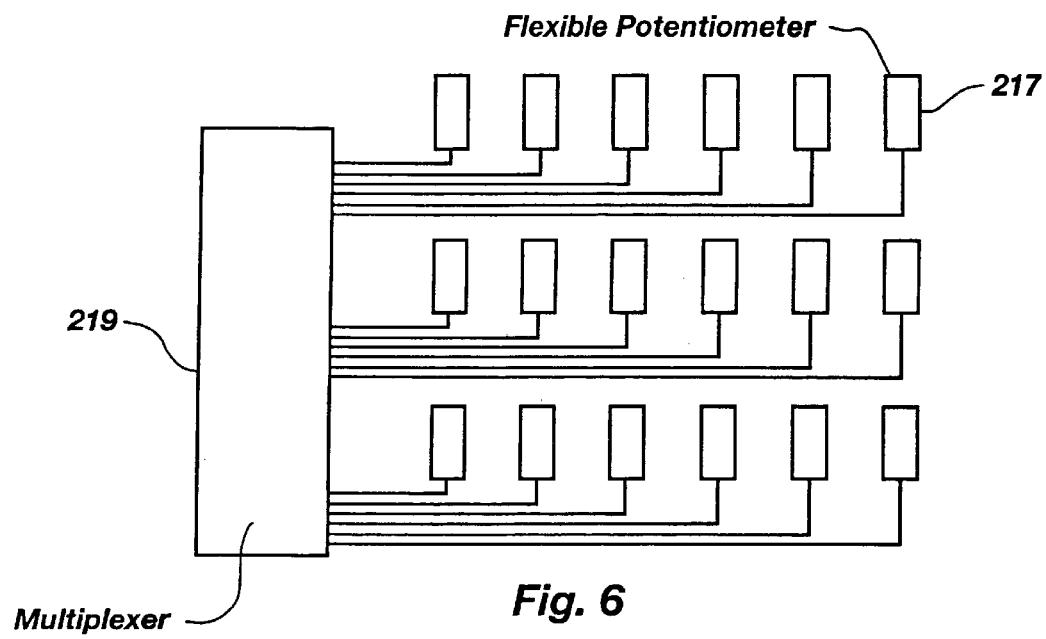
FIG. 6 shows a form of an array of flexible potentiometers.

An X-Y grid 213 (FIGS. 5A and 5B) could be used on the lower portion 215 of the seat 211. FIG. 6 shows one form of grid in which multiple flexible potentiometers 217 in an array are connected to a muliplexer 219. The array of flexible potentiometers 217 act as an X-Y grid.

Figure 7:
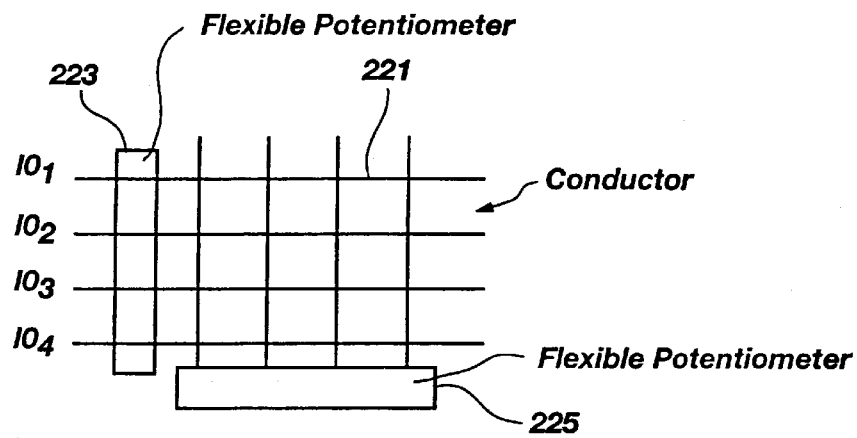
FIG. 7 shows another form of an array of flexible potentiometers.

FIG. 7 shows an alternate form of an X-Y grid in which a plurality of X conductors 221 are connected to an X flexible potentiometer 223 and a plurality of Y conductors are connected to a Y flexible potentiometer 225.

Figure 8:
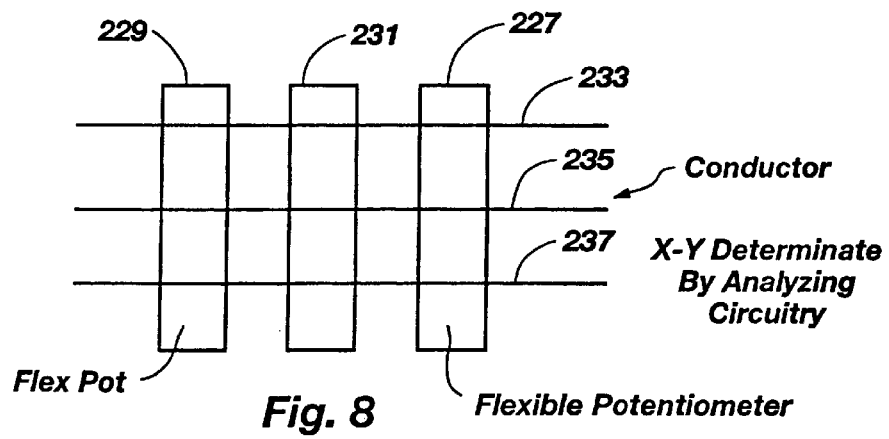
FIG. 8 shows yet another form of an array of flexible potentiometers.

FIG. 8 depicts yet another alternate form of an X-Y grid in which a plurality of flexible potentiometers 227, 229 and 231 interconnected by conductors 233, 235 and 237. Spacers are used between the conductors 233, 235 and 237 and the flexible potentiometers 227, 229 and 231. The X-Y location is determined by the analyzing circuitry.

A flexible potentiometer may be used as an antenna alone, a deflection sensor alone, or as a combination, antenna and deflection sensor. The antenna may detect a signal transmitted from a car seat or to a car seat.

Flexible potentiometers may be used in combination with other sensors, such as a piezoelectric element, a membrane and a force sensing resistor (FSR).

The position of a person may also be detected by the location of feet. Flexible potentiometers may be placed under a floor mat to detect the location of a user relative to the dash board or the doors to, in turn, regulate an air bag by itself or in combination with other detectors in the seats or elsewhere.

A flexible potentiometer may be used as a crush sensor to measure downward movement if a car is crushed from above. Downward movement may be detected through a sudden change in resistance of a flexible potentiometer oriented for such detection. X, Y, and Z axis detection may be utilized to detect and impact G-force.

A flexible potentiometer may be used to detect temperature. The resistance of a flexible potentiometer varies relatively little with temperature change, but the amount it varies is accurate and repeatable.

The term automobile is intended to include passenger cars, vans, trucks, airplanes, and other vehicles that employ air bags.

Weight and footprint may also be detected by downward pull on a flexible potentiometer.

Flexible potentiometers are marketed under the mark BEND SENSOR™ by Flexpoint, Inc., 6906 South 300 West, Midvale, Utah, 84047. Deflection sensors, other than flexible potentiometers, may have another electrical parameter that is altered through deflection. The variable resistance material of flexible potentiometers may be formed of an electrically conductive ink which predictably changes electrical resistance upon deflection or bending between a first configuration and a second configuration. Various types of phenolic resin materials are presently believed to be suitable for the variable resistance material. For example, a phenolic resin Formula 3609 manufactured by Electronic Materials Corporation of America (EMCA-REMEX Products, Ablestik Electronic Materials & Adhesives), 160 Commerce Drive, Montgomeryville, Pa., 18936, has been found suitable in that it is elastically flexible or bendable for many thousands of cycles or bends.

The variable resistive material may be a two-part epoxy material, a thermoset adhesive, or a thermoplastic, all incorporating conductive material such as graphite or carbon. The variable resistance material may include a carbon ruthenium.

Merely as examples, the substrate may be from about 0,005 to about 0.010 inches in thickness (although various other thicknesses may be acceptable); the variable resistive material may be from about 0.0003 to about 0.001 inches in thickness (although various other thicknesses may be acceptable).

To attach to a substrate, the variable resistance material may include a material which facilitates wetting, gluing, or sticking. The variable resistance material may include graphite in combination with a binder. The variable resistance material is preferably of the type which is applied to the substrate in liquid form and which in turn dries to a solid form.

A flexible potentiometer or series or grid of flexible potentiometers may be used to measure a degree or angle of deflection. Generally, the more the deflection, the greater the resistance. With these measurements, a relationship between the degree or angle of deflection and the resistance can be developed and used in software to deploy an air bag.

Segmented constant resistance conductive material may be used in combination with a flexible potentiometer to reduce the resistance. The segmented conductors may be made of silver, silver alloys, or other conductive metals, as well as conductive carbon-based compounds. The segmented conductors may be applied in a liquid form, or applied in a solid form which is pressed onto the variable resistance material. The conductivity of the segmented conductors remains essentially constant upon deflection. Therefore, the segmented conductors provide paths for electrical current that are in parallel with the path provided by the variable resistance material. The segmented conductors act as attenuators. It is believed that the segmented conductors may help to make the resistance versus load curve of a flexible potentiometer more linear. The segmented conductors may help make the resistance at a particular deflection configuration more consistently repetitive.

The variable resistance material may be spray painted, rolled, silk screened, or otherwise printed onto the substrate (which may be the inside of the bag cover). The variable resistance material may be a solid which is pressed onto the substrate. In the case where the bag cover is the substrate, another substrate, such as a polyester substrate may be unnecessary. Such an arrangement could be used without extensions or cantilevers, relying on deflections of the bag cover to produce defections in the variable resistance material of the flexible potentiometer.

It is believed but not known that as a flexible potentiometer (of some or all compositions) is deflected, the variable resistance material cracks or deforms. That is, in some or all compositions, dried variable resistance material has a granular or crystalline-type structure which cracks or breaks upon deflection. As the variable resistance material deflects, the number of cracks and the space between them is believed to increase, thereby changing the electrical resistance in a predictable manner. The change can be measured upon application of suitable electrical signals.

A conductive substrate may be used. The substrate may be connected to a particular potential, such as ground. Alternatively, a non-conductive coating may be applied to the substrate.

Certain flexible potentiometers have a substantial change in resistance only when deflected in a first direction from a straight position, not when deflected in an opposite direction from a straight position. Other flexible potentiometers change resistance in either direction from a straight position. There are various ways of constructing a deflection sensor that senses deflection in two directions from the straight position. Under a first construction, a first layer of variable resistance material is applied to one side of a substrate and a second layer of variable resistance material is applied to the other side of the substrate. Under a second construction, a layer of antimony tin oxide is applied over a substrate (e.g. a Kapton substrate), and a layer of variable resistive material is applied to the layer of antimony tin oxide. An extra layer of carbon may be applied over the layer of variable resistive material. When the substrate is deflected in a first direction from the straight position, the resistance of the variable resistance material increases by a predictable and repeatable amount. When the substrate is deflected in a second direction from the straight position, the resistance of the variable resistance material decreases by a predictable and repeatable amount. Under another technique, a layer of variable resistance material is applied to a single side of a substrate. The substrate is deflected to an initial setting so that the variable resistance material has an initial resistance value greater than that of the straight position. As the deflection of the substrate is increased from the initial setting, the resistance increases. As the deflection of the substrate is decreased from the initial setting, the resistance decreases. One end of the flexible potentiometer may be weighted and the deflection may be about a pivot point.

We claim:

1. A sensor system comprising:

a surface configured to receive and support a weight having a mass and a foot print, said surface being formed of a material which deflects in a pattern reflective of said mass and said foot print between a first position without said weight on said surface and a second position with said weight on said surface;

an array of flexible potentiometers each having an electrical resistance that predictably varies upon deflection from a first position to a second position, said array of flexible potentiometers being positioned under said surface, each of said flexible potentiometers being positioned to move from its first position to its second position to sense the deflection of said surface in said pattern between the first position of said surface and the second position of said surface and to generate deflection signals reflective of said pattern; and a circuit means connected to receive said deflection signals reflective of said pattern and to supply a control signal to an exterior receiver, said circuit means having means to process said deflection signals reflective of said pattern and to generate said control signal.

2. An air bag control system comprising:

a vehicle seat surface configured to receive and support a weight having a mass and a foot print, said vehicle seat surface being formed of a material which deflects or deforms in a pattern reflective of said mass and said foot print upon positioning of said mass thereon;

a flexible potentiometer having an electrical resistance that predictably varies upon deflection from a first position to a second position, said flexible potentiometer being positioned proximate said vehicle seat surface to deflect to sense the deflection of said surface in said pattern and to generate a deflection signal reflective of said deflection;

a circuit means connected to receive said deflection signal reflective of said pattern and to supply a control signal, said circuit means having means to process said deflection signals and to generate said control signal; and an air bag assembly positioned and enabled to present an air bag relative to said weight positioned on said vehicle seat surface upon receipt of a control signal from said circuit means.

3. An air bag control system comprising:

a vehicle seat surface configured to receive and support a weight having a mass and a foot print, said vehicle seat surface being formed of a material which deflects or deforms in a pattern reflective of said mass and said foot print upon positioning of said mass thereon;

a sensor means having an array of flexible potentiometers positioned proximate said vehicle seat surface to sense the deflection of said surface in said pattern and to generate a deflection signal reflective of said deflection;

a circuit means connected to receive said deflection signal and to supply a control signal, said circuit means having means to process said deflection signal and to generate said control signal; and an air bag assembly positioned and enabled to present an air bag relative to said weight positioned on said vehicle seat surface upon receipt of a control signal from said circuit means.

4. An air bag control system comprising:

a vehicle seat surface configured to receive and support a weight having a mass and a foot print, said vehicle seat surface being formed of a material which deflects or deforms in a pattern reflective of said mass and said foot print upon positioning of said mass thereon between a first position and a second position;

a array of flexible potentiometers each positioned under said vehicle seat surface to sense the deflection of said surface in said pattern between said first position and said second position and to generate deflection signals reflective of said deflection;

a circuit means connected to receive said deflection signals and to supply a control signal, said circuit means having means to process said deflection signals and to generate said control signal; and an air bag assembly positioned and enabled to present an air bag proximate to said weight positioned on said vehicle seat surface upon receipt of a control signal from said circuit means.

5. An air bag control system comprising:

a vehicle seat surface configured to receive and support a weight having a mass and a foot print, said vehicle seat surface being formed of a material which deflects or deforms in a pattern reflective of said mass and said foot print upon positioning of said mass thereon;

a sensor means having at least one flexible potentiometer positioned under said vehicle seat surface to deflect to sense the deflection of said surface in said pattern and to generate a deflection signal reflective of said deflection, said flexible potentiometer having an electrical resistance that predictably varies upon deflection from a first position to a second position;

a circuit means connected to receive said deflection signal and to supply a control signal, said circuit means having means to process said deflection signal and to generate said control signal; and an air bag assembly positioned and enabled to present an air bag relative to said weight positioned on said vehicle seat surface upon receipt of a control signal from said circuit means.

* * * * *